(12) United States Patent
Huang et al.

(10) Patent No.: US 8,059,730 B2
(45) Date of Patent: Nov. 15, 2011

(54) FREQUENCY SYNTHESIZER AND METHOD THEREOF

(75) Inventors: Tzuen-Hsi Huang, Hsinchu (TW); Tzu-Yi Yang, Taichung (TW); Zhi Wei Wang, Tainan County (TW)

(73) Assignee: Industrial Technology Research Institute, Hsinchu (TW)

( * ) Notice: Subject to any disclaimer, the term of this patent is extended or adjusted under 35 U.S.C. 154(b) by 1146 days.

(21) Appl. No.: 11/878,516

(22) Filed: Jul. 25, 2007

(65) Prior Publication Data

US 2008/0130768 A1   Jun. 5, 2008

(30) Foreign Application Priority Data

Nov. 30, 2006   (TW) .............................. 95144401 A

(51) Int. Cl.
  *H04K 1/10*   (2006.01)
  *H04L 27/28*   (2006.01)
(52) U.S. Cl. ...................................... 375/260
(58) Field of Classification Search .................. 375/130, 375/150, 259, 260, 267, 295, 316, 343, 376; 455/71, 76, 147, 255, 260
See application file for complete search history.

(56) References Cited

U.S. PATENT DOCUMENTS

| | | | |
|---|---|---|---|
| 6,693,468 B2 | 2/2004 | Humphreys et al. | |
| 2002/0030546 A1* | 3/2002 | Keating | ............................ 331/2 |
| 2006/0067293 A1 | 3/2006 | Santhoff et al. | |
| 2006/0256884 A1* | 11/2006 | Tomioka et al. | ............... 375/260 |
| 2007/0008429 A1* | 1/2007 | Cha et al. | ....................... 348/528 |
| 2007/0054682 A1* | 3/2007 | Fanning et al. | ................ 455/509 |
| 2007/0139124 A1* | 6/2007 | Stadius | ............................... 331/2 |
| 2007/0155350 A1* | 7/2007 | Razavi et al. | .................. 455/147 |
| 2007/0177653 A1* | 8/2007 | Bjerede | ......................... 375/130 |

FOREIGN PATENT DOCUMENTS

WO   WO 2005/074152 A1   8/2005

OTHER PUBLICATIONS

Batra et al., Texas Instruments et al., Nov. 2003, IEEE P802.15-03/268r2, pp. 1-69.
Liang et al., A Fast-Switching Frequency Synthesizer for UWB Applications, pp. 197-200.
Leenaerts et al., ISSCC 2005/Session 11/Ultra Wideband Solutions/11.2, pp. 202-203, 593.
Sandner et al., A 3Ghz to 7Ghz Fast-Hopping Frequency Synthesizer for UWB, pp. 405-409.

(Continued)

*Primary Examiner* — David C. Payne
*Assistant Examiner* — Syed Haider
(74) *Attorney, Agent, or Firm* — Birch, Stewart, Kolasch & Birch, LLP

(57) ABSTRACT

A frequency synthesizer and a method thereof. The method comprises grouping the carrier frequencies into first through fifth frequency groups comprising the first to third frequencies, the fourth to sixth frequencies, the seventh to ninth frequencies, the tenth to twelfth frequencies, and the thirteenth to fourteenth frequencies, generating a center frequency of the third frequency group, frequency mixing the center frequency of the third frequency group to produce center frequencies of the first, second, fourth, and fifth frequency groups, and performing frequency mixing on the center frequencies of the first through fifth frequency groups to produce two adjacent frequencies for each center frequency.

26 Claims, 8 Drawing Sheets

OTHER PUBLICATIONS

Hyun-Su Chae et al., A Fast Hopping Frequency Synthesizer for UWB Systems in a CMOS Technology, pp. 370-374.

van de Beek et al., Proceedings of ESSCIRC, Grenoble, France, 2005, pp. 173-176.

Lee et al., ISSCC 2005/Session 11/Ultra Wideband Solutions/11.3, pp. 204-205, 593.

Mishra et al., IEEE Transactions on Microwave Theory and Techniques, vol. 53, No. 12, Dec. 2005, pp. 3744-3756.

Lin et al., Subharmonic Direct Frequency Synthesizer for Mode-1 MB-OFDM UWB System in 2005 Symposium on VLSI Circuits Digest of Technical Papers, pp. 38-41; Taipei, Taiwan, R.O.C.

* cited by examiner

FREQUENCY SYNTHESIZER AND METHOD THEREOF

BACKGROUND OF THE INVENTION

1. Field of the Invention

The invention relates to a frequency synthesizer, and in particular to a frequency synthesizer in a Multi-Band Orthogonal Frequency Division Multiplexing (MB-OFDM) Ultra Wideband (UWB) system.

2. Description of the Related Art

Multi-Band Orthogonal Frequency Division Multiplexing (MB-OFDM) Ultra Wideband (UWB) systems (referred to as MB-OFDM UWB systems hereinafter) include a working spectrum from 3.1 GHz to 10.6 GHz, the spectrum is divided into 14 bands, each comprising 528 MHz. FIG. 1 is a spectrum diagram for a MB-OFDM UWB system, comprising first frequency band b1 to fourteenth frequency band b14, each frequency band comprises a carrier frequency, referred to as first frequency f1 to fourteenth frequency f14 and located at 3432 MHz, 3960 MHz, 4488 MHz, 5016 MHz, 5544 MHz, 6072 MHz, 7128 MHz, 7656 MHz, 8184 MHz, 8712 MHz, 9240 MHz, 9768 MHz, and 10296 MHz respectively. Every three frequency bands are grouped to provide first group BG1 to fifth group BG5. Note fifth group BG5 only comprises frequency bands b13 and b14.

Based on MB-OFDM UWB standard, a frequency synthesizer in a MB-OFDM UWB system must provide the three frequency bands in first group BG1 from 3.1 GHz to 4.8 GHz, referred to as Mode-1 (or Mandatory) operation. The MB-OFDM UWB system can optionally provide frequency bands exceeding 5 GHz to provide high data throughput, referred to as Mode-2 operation. Since fast switching between the frequency bands ($\leq 9.5$ ns) is required in the operation, the conventional phase lock loop (PLL) cannot meet system requirements. Utilizing frequency mixing technique to generate the required frequencies selected by the multiplexers provides a feasible solution. However, related disclosures [1] to [7] are only applicable to Mode-1 operation. Disclosure [8] supports Mode-2 operation, but only generates 7 frequency bands, rather than the fourteen frequency bands for the MB-OFDM UWB system. Disclosure [9] supports all fourteen frequency bands, but comprises a PLL and 5 mixers, and possibly generating large noise and degrading transmission signals.

Current telecommunication development aims for high speed/high volume wireless communication. A MB-OFDM UWB device can offer the solution to such requirements of additional functions beyond telecommunication. Thus a need exists for a frequency synthesizer covering the whole spectrum for a MB-OFDM UWB system, comprising minimum numbers of single sideband mixers to reduce the generated spurs.

[1]: IEEE 802.15.3a, Updated MB-OFDM Proposal Specification (03/268r3), March 2004, by MBOA

[2]: C. F. Liang and S. I. Liu, "A Fast-Switching Frequency Synthesizer for UWB applications," IEEE 2005 Asia Solid-State Circuit Conference, 8-2, November 2005, pp. 197-200

[3]: C. C. Lin and C. K. Wang, "Subharmonic Direct Frequency for Mode-1 MB-OFDM UWB System", IEEE 2005 Symposium on VLSI Circuits, 3-3, pp 38-41.

[4]: C. Sandner, et al., "A 3 GHz to 7 GHz Fast-Hopping Frequency Synthesizer for UWB," International Workshop on Ultra Wideband System, 2004, 18-21, May 2004, pp. 405-409.

[5]: D. Leenaerts, et al., "A SiGe BiCMOS ins Fast Hopping Frequency Synthesizer for UWB Radio," 2005 IEEE Int. Solid-State Circuit Conference, 11-2, pp. 202-203.

[6]: Hyun-Su Chae, et al., "A Fast Hopping Frequency Synthesizer for UWB Systems in a CMOS Technology," Int. Symp. on Wireless Communication Systems 2005, 5-9 Sep. 2005, pp 370-374.

[7]: Remco van de Beek, et al. "A fast-hopping single-PLL 3-band UWB synthesizer in 0.25 um SiGe BiCMOS," Proceedings of 31th ESSCIRC 2005, 12-16 Sep. 2005, pp. 173-176.

[8]: Jri Lee and Da-Wei Chiu, "A 7-band 3-8 GHz Frequency Synthesizer With 1 ns Band-Switching Time in 0.18 um CMOS Technology", IEEE 2005 Int. Solid-State Circuit Conference, 11-3, pp. 204-205, 2005.

[9]: C. Mishra, et al., "Frequency Planning and Synthesizer Architectures for Multiband OFEM UWB radios," IEEE Trans. on Microwave Theory and Techniques, vol. 53, issue 12, December 2005, pp. 3744-3756.

BRIEF SUMMARY OF THE INVENTION

A detailed description is given in the following embodiments with reference to the accompanying drawings.

According to an embodiment of the invention, a method of synthesizing frequency is disclosed, producing a plurality of carrier frequencies for Ultra Wideband (UWB) with multi-band orthogonal frequency division multiplexing (MB-OFDM), the sequential carrier frequencies from low to high comprising first through fourteenth frequencies, any pair of two adjacent carrier frequencies being separated by a fundamental separation frequency. The method comprises grouping the carrier frequencies into first through fifth frequency groups comprising the first to third frequencies, the fourth to sixth frequencies, the seventh to ninth frequencies, the tenth to twelfth frequencies, and the thirteenth to fourteenth frequencies, generating a center frequency of the third frequency group, frequency mixing procedure on the center frequency of the third frequency group to produce center frequencies of the first, second, fourth, and fifth frequency groups, and performing frequency mixing on the center frequencies of the first through fifth frequency groups to produce two adjacent frequencies for each center frequency.

Also provided is a method of synthesizing frequency, producing a plurality of carrier frequencies for Ultra Wideband (UWB) with multi-band orthogonal frequency division multiplexing (MB-OFDM), the carrier frequencies comprising first through fourteenth frequencies in an order of low to high, any two adjacent carrier frequencies being separated by a fundamental separation frequency. The method comprises generating the eighth frequency, generating first and second separation frequencies, and selecting a separation output frequency between the first and second separation frequencies, wherein the first and second separation frequencies are multiples of the fundamental separation frequency, generating the fundamental separation frequency, performing frequency mixing on the eighth frequency and the separation output frequency to generate first output frequency, wherein the output frequency is the eighth, second, fourteenth, fifth, or eleventh carrier frequency, and performing frequency mixing selectively on the first output frequency and the fundamental separation frequency to generate second output frequency, wherein the output frequency is one of the first through fourteenth frequencies According to another embodiment of the invention, a frequency synthesizer producing a plurality of carrier frequencies for Ultra Wideband (UWB) with multi-band orthogonal frequency division multiplexing (MB-OFDM), the carrier frequencies comprising first through fourteenth frequencies in an order of low to high, any two adjacent carrier frequencies being separated by a fundamental separation frequency. The frequency synthesizer comprises a phase lock loop, and first and second mixers. The phase lock loop generates the eighth carrier frequency. The first mixer performs selective frequency mixing on the eighth frequency to generate first output frequency, wherein the output frequency is the eighth, second, fourteenth, fifth, or eleventh carrier frequency. The second mixer performs selective frequency mixing on the first output frequency to generate second output frequency, wherein the output frequency is one of the first through the fourteenth frequencies.

Further provided is a frequency synthesizer, producing a plurality of carrier frequencies for Ultra Wideband (UWB) with multi-band orthogonal frequency division multiplexing (MB-OFDM), the carrier frequencies comprising first through fourteenth frequencies in an order of low to high, any two adjacent carrier frequencies being separated by a fundamental separation frequency. The frequency synthesizer comprises a phase lock loop (PLL), a separation frequency generator, and first and second mixers. The PLL generates an initialization signal having a frequency equivalent to the eighth frequency. The separation frequency generator outputs first and second separation output signals, wherein the first or second separation frequency equals a multiple of the fundamental separation frequency, and a frequency of the second separation output frequency is the fundamental separation frequency. The first mixer performs the frequency mixing procedure on the eighth frequency and the separation output frequency to generate first output frequency, wherein the output frequency is the eighth, second, fourteenth, fifth, or eleventh carrier frequency. The second mixer performs the frequency mixing procedure selectively on the first output frequency and the fundamental separation frequency to generate second output frequency, wherein the output frequency is one of the first through fourteenth frequencies

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
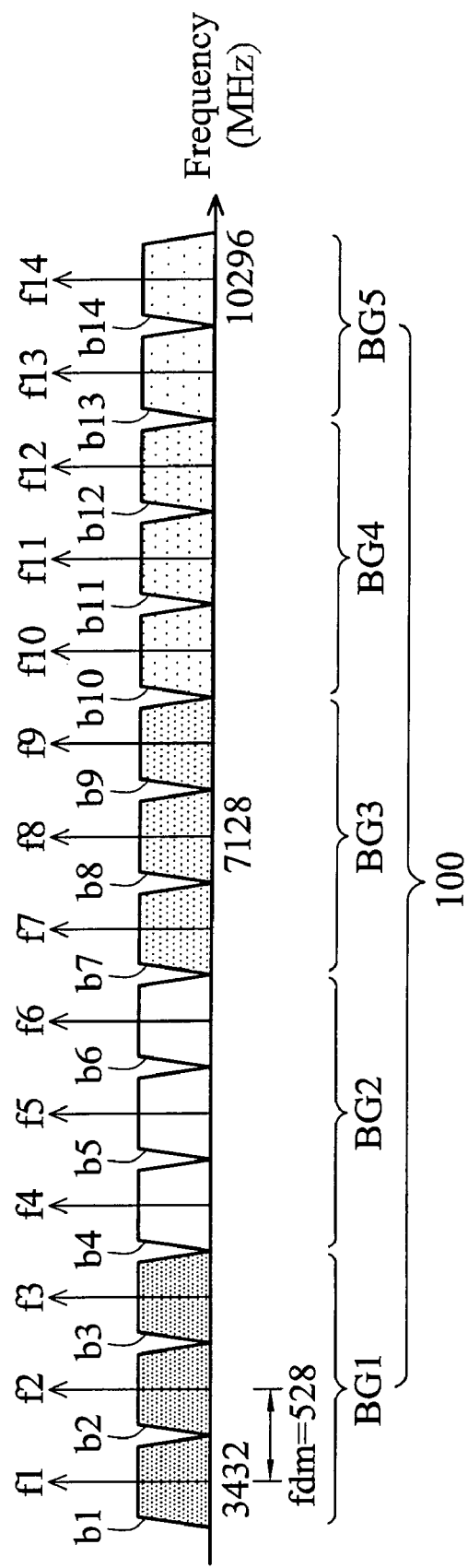
FIG. 1 is a spectrum diagram for a MB-OFDM UWB system.
Figure 2A:
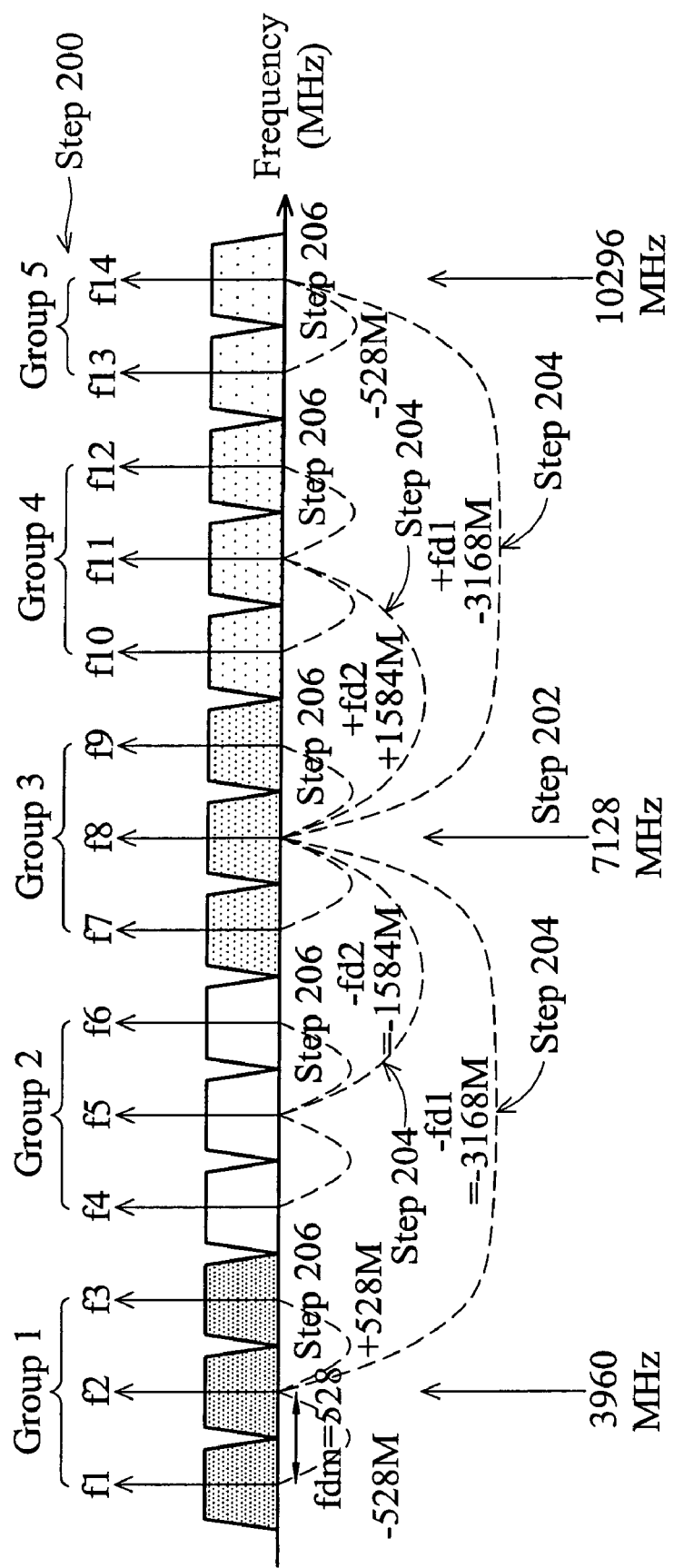
FIG. 2A is an exemplary frequency planning diagram according to the invention.
Figures 2B, 2C:
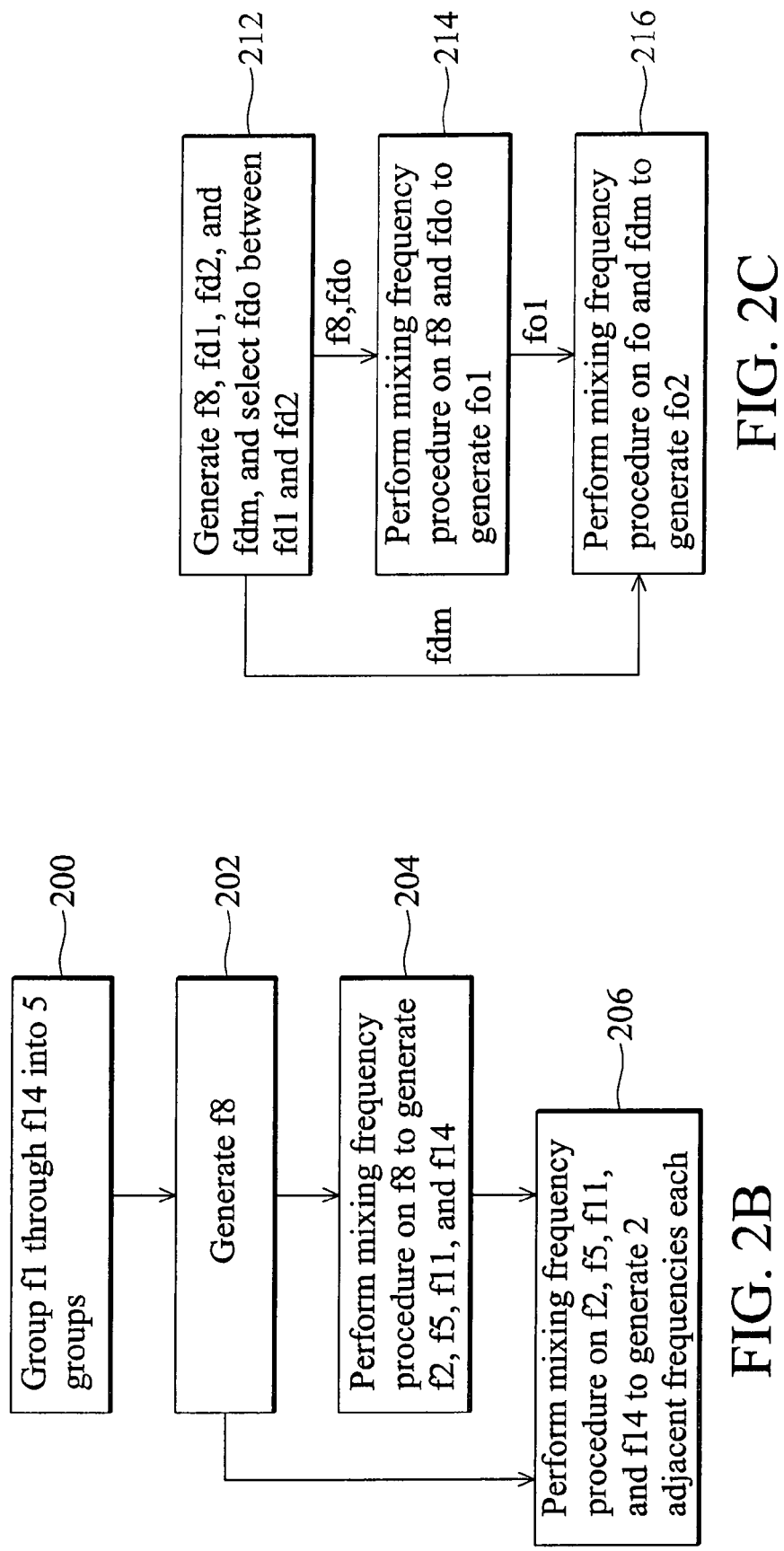
FIG. 2B is an exemplary flowchart of producing first frequency f1 through fourteenth frequency f14 in a MB-OFDM UWB system.
FIG. 2C shows an embodiment according to the frequency generation method in FIG. 2B.

FIG. 2A is an exemplary frequency planning diagram according to the invention, FIG. 2B is an exemplary flowchart of producing first frequency f1 through fourteenth frequency f14 in a MB-OFDM UWB system. Referring to FIG. 2A, depicting first frequency f1 through fourteenth frequency f14 from low to high, representing 3432 MHz, 3960 MHz, 4488 MHz, . . . , 9768 MHz, and 10296 MHz required in the MB-OFDM UWB system, any two adjacent frequencies are separated by fundamental separation frequency fdm (528 MHz).

Referring to FIGS. 2A and 2B, in step S200, frequencies f1 through f14 are grouped in five, indicated by first frequency group Group1 through fifth frequency group Group5. Note fifth frequency group Group5 comprises only thirteenth frequency f13 and fourteenth frequency f14.

Next in step S202, a center frequency (eighth frequency f8) of group Group3 is generated.

In step S204, frequency mixing is performed on eighth frequency f8 to generate a center frequency of frequency group Group1 (second frequency f2), a center frequency of frequency group Group2 (fifth frequency f5), a center frequency of frequency group Group4 (eleventh frequency f11), and a center frequency of frequency group Group5 (fourteenth frequency f14).

In step S206, frequency mixing is performed on the center frequencies of groups Group 1 though Group 5 (frequencies f2, f5, f8, f11, and f14) to generate two adjacent frequencies for each center frequency thereof. Specifically, frequency mixing on second frequency f2 generates first frequency f1 and third frequency f3, on fifth frequency f5 generates fourth frequency f4 and sixth frequency f6, on eighth frequency f8 generates seventh frequency f7 and ninth frequency f9, on eleventh frequency f11 generates tenth frequency f10 and twelfth frequency f12, and on fourteenth frequency f14 generates thirteenth frequency f13.

Steps S200 through S206 produce a complete set of fourteen frequencies, including first frequency f1 though fourteenth frequency f14.

FIG. 2C shows an embodiment according to the frequency generation method in FIG. 2B. Referring to FIGS. 2A, 2B, and 2C, in step S212, eighth frequency f8 (7128 MHz), first and second separation frequencies fd1 and fd2, and fundamental separation frequency (528 MHz) are produced. One of first and second separation frequencies fd1 and fd2 is separation output frequency fdo. First and second separation frequencies fd1 and fd2 are multiples of the fundamental separation frequency fdm. In an embodiment, first and second separation frequencies fd1 and fd2 are six times and three times fundamental separation frequency fdm, i.e., 3168 MHz and 1584 MHz as illustrated on FIG. 2A.

In one embodiment of step S212, eighth frequency f8 and first separation frequency fd1 are generated in advance by, for example, a phase lock loop (PLL) comprising two voltage controlled oscillators (VCO). The two voltage controlled oscillators produce eighth frequency f8 and first separation frequency fd1 respectively. A first divider divides first separation frequency fd1 by a first integer, for example, 2, to generate second separation frequency fd2, in turn a second divider divides second separation frequency fd2 by a second integer, for example, 3, to generate fundamental separation frequency fdm, and a multiplexer selects separation output frequency fdo between first and second separation frequencies fd1 and fd2.

In step S214, selective frequency mixing on eighth frequency f8 and separation output frequency fdo generates first output frequency fo1. First output frequency fo1 may equal eighth frequency f8, (f8−fdo), or (f8+fdo). When separation output frequency fdo is first separation frequency fd1 (3168 MHz), first output frequency fo1 is eighth frequency f8, the center frequency of first frequency group Group1 (second frequency f2), or the center frequency of fifth frequency group Group5 (fourteenth frequency f14). When separation output frequency fdo is second separation frequency fd2 (1584 MHz), first output frequency fo1 is eighth frequency f8, the center frequency of second frequency group Group2 (fifth frequency f5), or the center frequency of fourth frequency group Group4 (fifth frequency f11).

In step S216, selective frequency mixing on first output frequency fo1 from step S214 and fundamental separation frequency fdm (528 MHz) from step S212 generates second output frequency fo2, which equals fo1, (fo1−fdm), or (fo1+fdm). When first output frequency fo1 is the center frequency of first frequency group Group1 (second frequency f2), second output frequency fo2 is one frequency in first frequency group1 (f1, f2, or f3). When first output frequency fo1 is the center frequency of second frequency group Group2 (fifth frequency f5), second output frequency fo2 is one frequency in second frequency group2 (f4, f5, or f6). When first output frequency fo1 is the center frequency of third frequency group Group3 (fifth frequency f8), second output frequency fo2 is one frequency in third frequency group1 (f7, f8, or f9). When first output frequency fo1 is the center frequency of fourth frequency group Group4 (fifth frequency f11), second output frequency fo2 is one frequency in fourth frequency group4 (f10, f11, or f12). When first output frequency fo1 is the center frequency of fifth frequency group Group5 (fifth frequency f14), second output frequency fo2 is one frequency in fifth frequency group5 (f13, or f14). The frequency generated in step S216 is one of the fourteen frequencies (first frequency f1 through fourteenth frequency f14). Note that since (f14+fd3) does not fall in frequency range of MB-OFDM UWB, the option of selecting second output frequency fo2 being (f14+fd3) can be eliminated, or retained while leaving (f14+fd3) out of circuitry after the frequency synthesizer.

Figure 3:
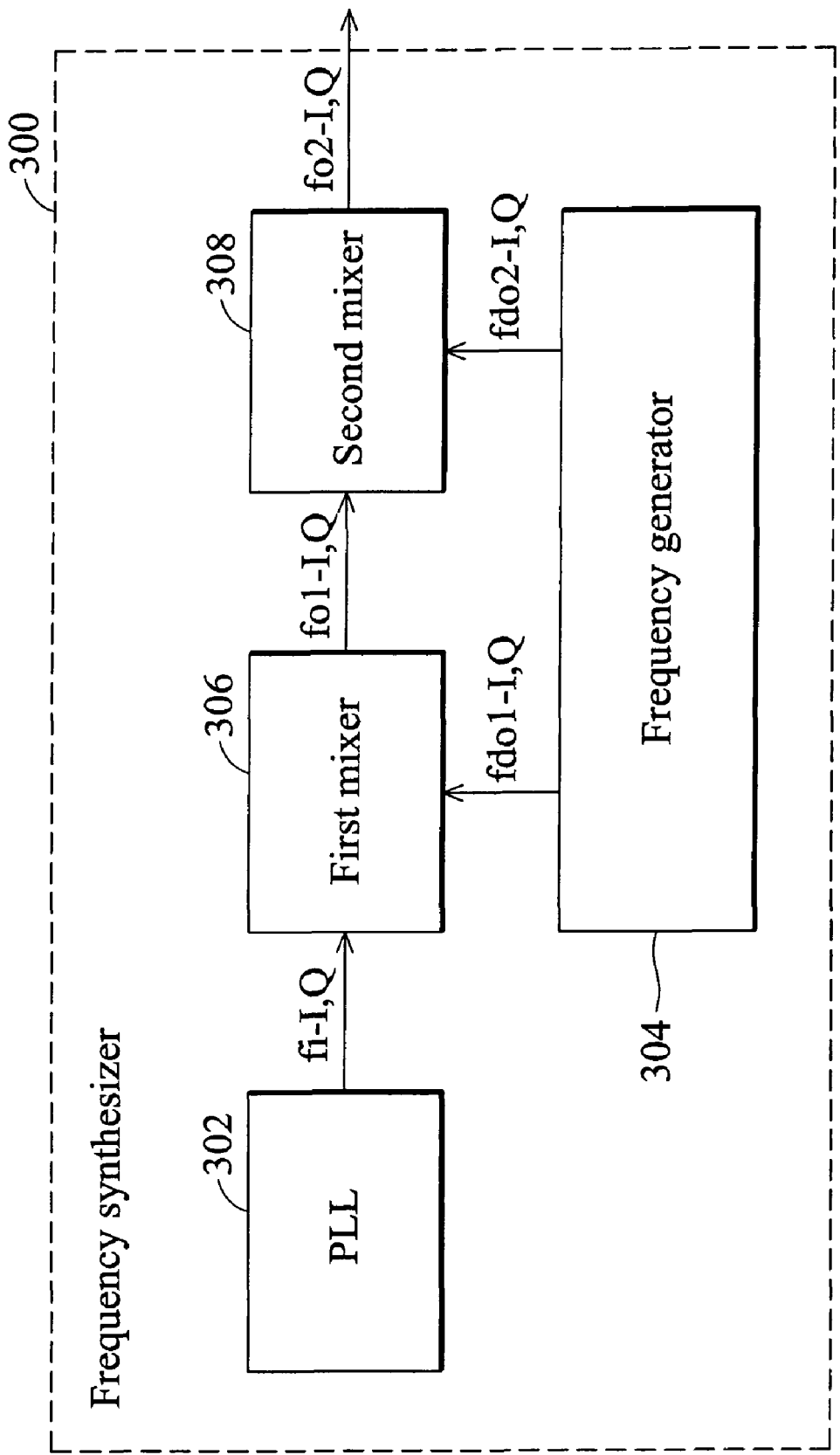
FIG. 3 is a block diagram of an exemplary frequency synthesizer.

FIG. 3 is a block diagram of an exemplary frequency synthesizer, incorporated in the method in FIG. 2C. Frequency synthesizer 300 comprises phase lock loop 302, separation frequency generator 304, first mixer 306, and second mixer 308.

Phase lock loop 302 generates initialization in-phase signal fi-I and initialization quadrature signal fi-Q (referred to as initialization signals f0-I, Q hereinafter), both comprise frequencies equaling eighth frequency f8 (7128 MHz) in FIG. 2A, and phase difference is 90° therebetween. Initialization signals f0-I, Q are provided to first mixer 306.

Separation frequency generator 304 provides first separation output signal fdo1-I, Q including in-phase signal fdo1-I and quadrature signal fdo1-Q. The frequency of first separation output signal fdo1-I, Q, also referred to as first separation output frequency fdo1, is selected as first separation frequency fd1 or second separation frequency fd2. First and second separation frequencies fd1 and fd2 are multiples of fundamental separation frequency fdm. In an embodiment, first and second separation frequencies fd1 and fd2 are six times and three times fundamental separation frequency fdm, or 3168 MHz and 1584 MHz in FIG. 2A. Separation frequency generator 302 provides first separation output signal fdo1-I,Q to first mixer 306, and provides second separation output signal fdo2-I,Q to second mixer 308. With reference to FIG. 2C phase lock loop 302 and separation frequency generator 304 perform step 212.

First mixer 306 performs selective frequency mixing on initialization signal fi-I, Q (the frequency equaling eighth frequency f8=7128 MHz) from phase lock loop 302, and first separation output signal fd-I, Q from separation frequency generator 304, to generate first in-phase signal fo1_I and first output quadrature signal Fo1-Q (referred to as first output signal fo1-I, Q hereinafter) with identical frequencies and phase difference 90° therebetween. First mixer 306 then provides first output signal fo1-I, Q to second mixer 308. The frequency of first output signal fo1-I, Q (referred to as first output frequency fo1) may be eighth frequency f8, (f8−fd1), or (f8+fd1) based on different frequency mixing procedure. When first separation output frequency fdo1 is first separation frequency fd1 (3168 MHz), first output frequency fo1 is eighth frequency f8, the center frequency of first frequency group Group1 (second frequency f2), or the center frequency of fifth frequency group Group5 (fourteenth frequency f14). When first separation output frequency fdo1 is second separation frequency fd2 (1584 MHz), first output frequency fo1 is eighth frequency f8, the center frequency of second frequency group Group2 (fifth frequency f5), or the center frequency of fourth frequency group Group4 (fifth frequency f11). When the frequency mixing procedure of initialization signal (eighth frequency f8) and first separation output frequency fdo1 is bypassed, first output frequency fo1 is eighth frequency f8. With reference to FIG. 2C first mixer 306 performs step S214.

Second mixer 308 performs selective frequency mixing on first output signal fo1-I, Q from first mixer 306 and second separation output signal fdo2-I, Q from separation frequency generator 302 to generate second output in-phase signal fo2-I and second output quadrature signal fo2-Q (referred to as second output signal fo2-I, Q), both comprising identical frequency and a phase difference therebetween of 90°. The frequency of second output signal fo2-I, Q (referred to as second output frequency fo2) may be first output frequency fo1, (fo1−fo2), or (fo1+fo2) according to different frequency mixing scheme. When first output frequency fo1 is the center frequency of first frequency group Group1 (second frequency f2), second output frequency fo2 is one frequency in first frequency group1 (f1, f2, or f3). When first output frequency fo1 is the center frequency of second frequency group Group2 (fifth frequency f5), second output frequency fo2 is one frequency in second frequency group2 (f4, f5, or f6). When first output frequency fo1 is the center frequency of third frequency group Group3 (fifth frequency f8), second output frequency fo2 is one frequency in third frequency group1 (f7, f8, or f9). When first output frequency fo1 is the center frequency of fourth frequency group Group4 (fifth frequency f11), second output frequency fo2 is one frequency in fourth frequency group4 (f10, f11, or f12). When first output frequency fo1 is the center frequency of fifth frequency group Group5 (fifth frequency f14), second output frequency fo2 is one frequency in fifth frequency group5 (f13, or f14). The frequency generated in step S216 is one of the fourteen frequencies (first frequency f1 through fourteenth frequency f14). Note that since (f14+fd3) does not fall in frequency range of MB-OFDM UWB, thus the option of selecting second output frequency fo2 being (f14+fd3) can be eliminated, or retained while leaving (f14+fd3) out of circuitry after the frequency synthesizer. With reference to FIG. 2C, second mixer 308 performs step S216.

Note first and second mixers 306 and 308 are 4-phase mixers. Therefore initialization signal fi-I, Q, first and second separation output signals fdo1-I, Q, and fdo2-I, Q and first and second output signals fo1-I, Q, and fo2-I, Q are all 4-phase signals, i.e., each signal includes an in-phase signal comprising inverting and non-inverting signals, and an quadrature signal comprising inverting and non-inverting signals. For example, initialization in-phase signal fi-I comprises a non-inverting signal fi-I (+) and an inverting signal fi-I (−), and initialization quadrature signal fi-Q comprises a non-inverting signal fi-Q (+) and an inverting signal fi-Q (−).

Figure 4:
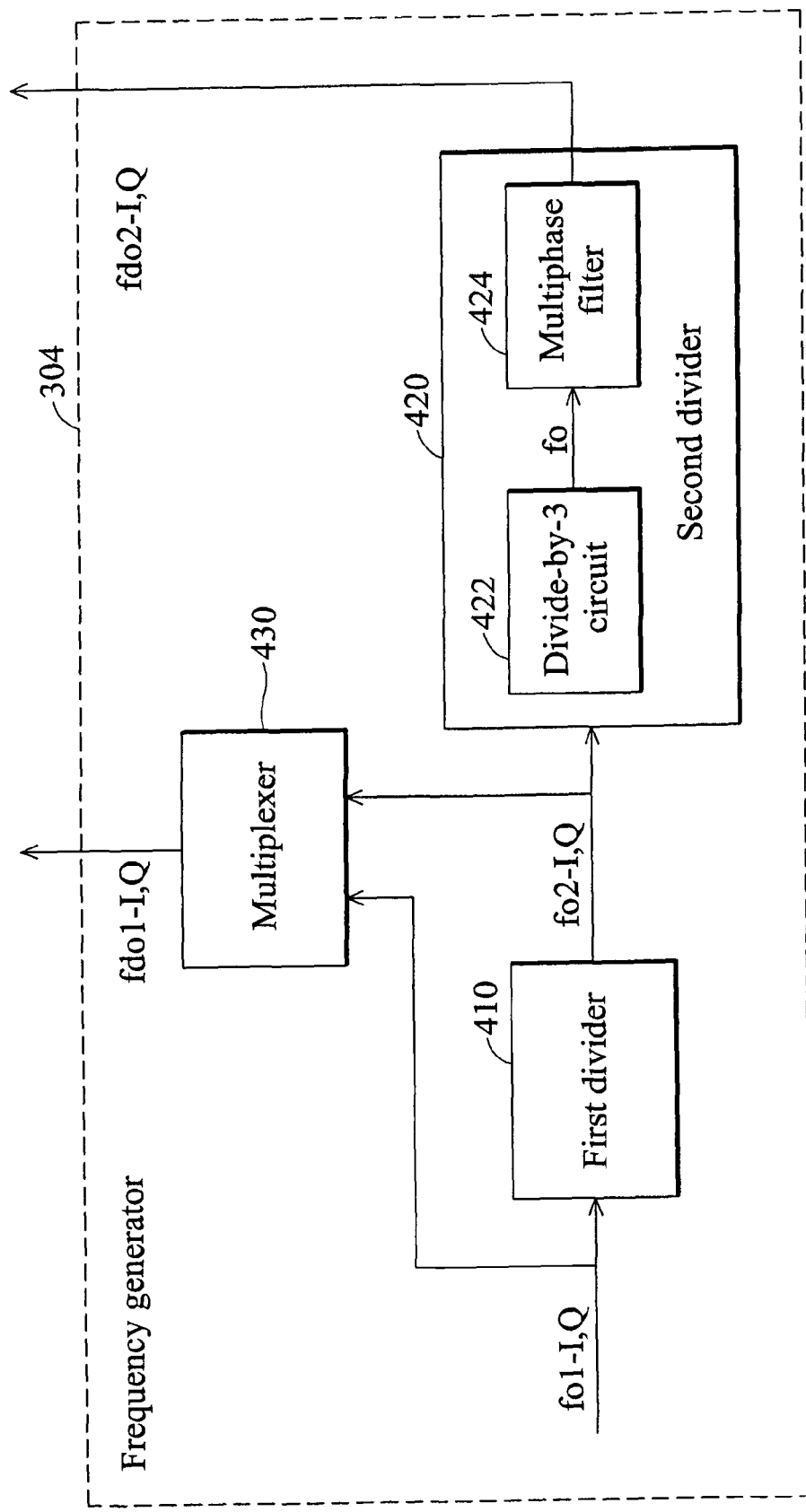
FIG. 4 is a detailed block diagram of exemplary second divider 420 in FIG. 3.

FIG. 4 is a block diagram of an exemplary separation frequency generator in FIG. 3. Separation frequency generator 302 comprises first divider 410, second divider 420, and multiplexer 430.

First divider 410 may be an analog or digital divider, coupled to first separation signal fd1-I, Q with the frequency of first separation frequency fd1, and dividing first separation frequency fd1 by first integer N1 (N1 is 2 in the embodiment) to generate second separation signal fd2-I, Q with the frequency equaling second separation frequency.

Multiplexer 430 is configured to receive first separation signal fd1-I, Q and second separation signal fd2-I, Q from first divider 410, and selectively outputs one therebetween as first separation output signal fd1-I, Q.

Note first separation signal fd1-I, Q can be generated from phase lock loop 302 that generates initialization signal fi-I, Q. In an embodiment, phase lock loop 302 generates initialization signal fi-I, Q, and uses another phase lock loop to generate first separation signal fd1-I, Q, provided to first divider 410 (not shown).

Second divider 420 may be an analog or digital divider, receiving second separation signal fd2-I,Q from first divider 410, and dividing second separation frequency fd2 by second integer N2 (N2 is 3 in the embodiment) to generate second separation output signal fdo2-I, Q having frequency of fd2/N2 to second mixer 308.

FIG. 4 is a detailed block diagram of exemplary second divider 420 in FIG. 3, when N2 is 3. Second divider 420 comprises a divide-by-3 circuit 422 and multiphase filter 424. Divide-by-3 circuit 422 is configured to receive second separation signal fd2-I, Q, and divide second separation signal fd2-I, Q by 3 to generate 2-phase output signal fo (including non-inverting signal fo(+) and inversing signal fo(−)). Multiphase filter 424 is configured to receive output signal fo, and generate second separation output signal fd2-I, Q having 4 phases.

Figure 5A:
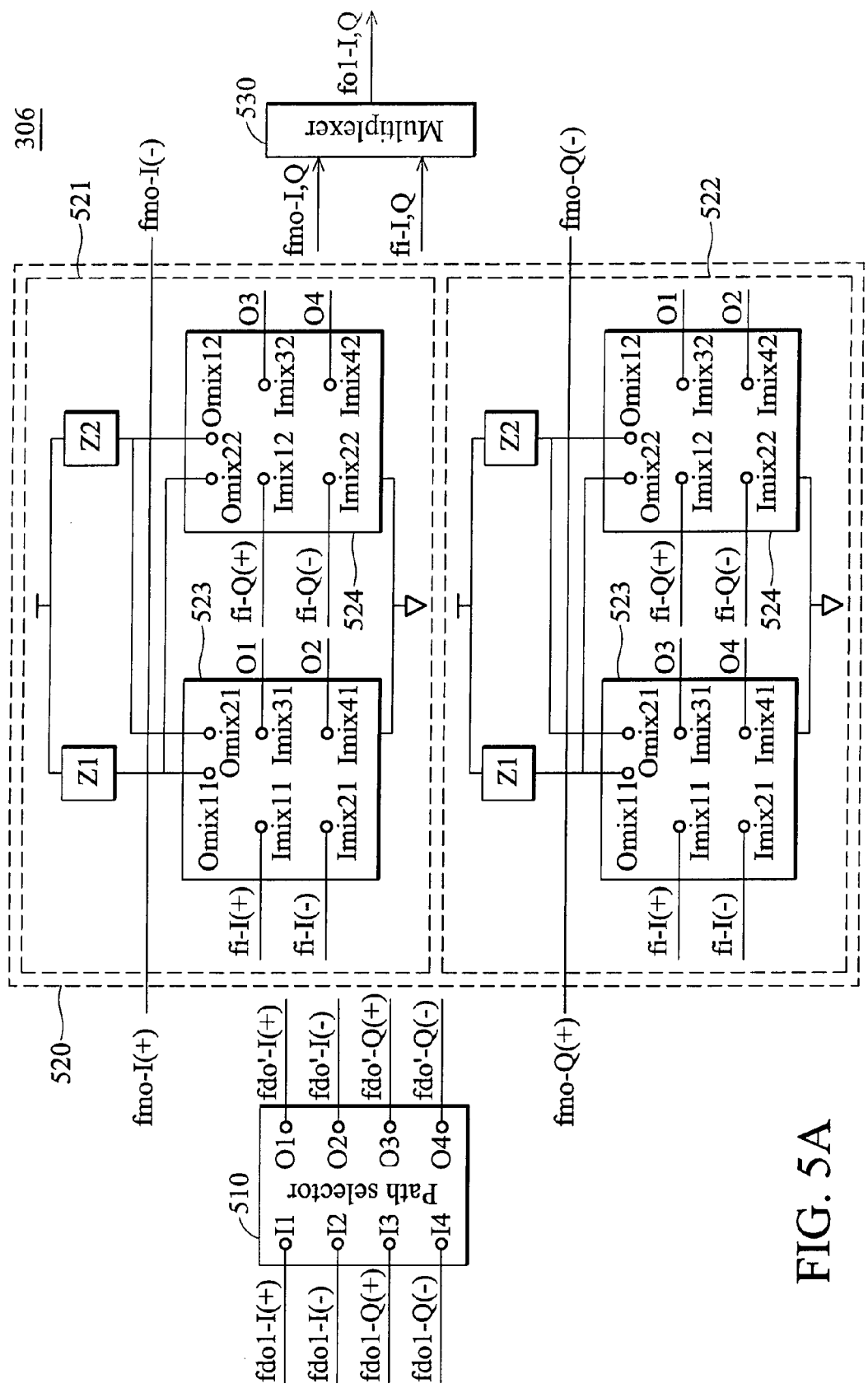
FIG. 5A is a block diagram of an exemplary first mixer 306 in FIG. 3.

FIG. 5A is a block diagram of an exemplary first mixer 306 in FIG. 3. First mixer 306 comprises path selector 510, single-band mixer 520, and multiplexer 530. Path selector 510 is configured to change phase order of first separation output signal fdo1-I, Q to generate phase change signal fdo'-I, Q (including phase change in-phase signal fdo'-I and phase change quadrature signal fdo'-I). path selector 510 comprises four inputs I1 through I4, and four outputs O1 though O4. Inputs I1 and I2 are coupled to non-inverting signal fd1-I(+) and inverting signal fd1-I(−) of first separation output in-phase signal fdo1-I, outputs I3 and I4 are coupled to non-inverting signal fdo1-Q(+) and inverting signal fdo1-Q(−) of first separation output quadrature signal fdo1-Q. Similarly, outputs O1 and O2 are coupled to non-inverting signal fdo'1-I(+) and inverting signal fdo'1-I(−) of first separation output in-phase signal fdo'1-I, outputs I3 and I4 are coupled to non-inverting signal fdo'1-Q(+) and inverting signal fdo'1-Q(−) of first separation output quadrature signal fdo'1-Q. The initial phase order of first separation output signal fdo1-I, Q is I(+), I(−), Q(+), and Q(−). Path selector 510 changes the initial phase order to, for example, Q(+), Q(−), I(+), and I(−), for output to outputs O1 through O4 to provide fdo'-I(+), fdo'-I(−), fdo'-Q(+), fdo'-Q(−) to single band mixer 520.

Single band mixer 520 is configured to perform frequency mixing on initial signal fi_I, Q and phase change signal fdo'I, Q to generate mixed output signal fdom-I, Q. FIG. 5A also shows detailed circuit schematic of single band mixer 520, comprising first and second blocks 521 and 522.

Block 521 comprises first and second frequency mixing circuit2 523 and 524, and first and second load impedance (for example, resistance) Z1 and Z2. First frequency mixing circuit 523 comprises input terminals Imix11, Imix21, Imix31, and Imix41, and output terminals Omix11 and Omix21. Similarly, second frequency mixing circuit 522 comprises input terminals Imix12, Imix22, Imix32, and Imix42, and output terminals Omix12 and Omix22. Input terminals Imix11, Imix21, Imix31, and Imix41 are coupled to four phase signals fdi-I(+), fdi-I(−), fdi-Q(+), and fdi-Q(−) of the initialization in-phase signal. Further, input terminals Imix12, Imix22, Imix32, and Imix42 are coupled to output terminals O1, O2, O3, and O4 of path selector 510. Output terminals Omix11 and Omix22 are coupled to each other, and output non-inverting signal fmo-I(+) of in-phase signal fmo-I. Likewise, output terminals Omix21 and Omix12 are coupled to each other, and output inverting signal fmo-I(−) of in-phase signal fmo-I.

Second block 522 utilizes identical circuit configuration to first block 521, thus following the naming convention thereof. Input terminals Imix 31, Imix 41, Imix 32 and Imix 42 of second block 522 are coupled to output terminals O3, O4, O1, and O2 of path selector 510, and output terminals Omix 11 and Omix 21 output non-inverting signal fmo-Q(+) and inverting signal fmo-Q(−) of mixed frequency output quadrature signal fmo-Q. Description of second block 522 is omitted herefrom for simplicity.

When path selector 510 selects phase change signal fdo'-I, Q, a frequency of mixed frequency output signal fmo-I, Q is selected to be (f8−fdo1) or (f8+fdo1). Table 1 shows relationship between frequencies of phase change signal fdo'_I, Q and that of mixed frequency output signal fmo-I, Q. According to table 1, when selecting the frequency of mixed frequency output signal fmo-I, Q to be (f8−fdo1), path selector 510 can output first separation output signal fdo1-I,Q as phase change signal fdo'-I, Q without altering the phase order thereof. When selecting the frequency of mixed frequency output signal fmo-I, Q to be (f8+fdo1), path selector 510 changes the phase order of first separation output signal fdo1-I, Q to I(+), I(−), Q(−), and Q(+) to map to four phases I(+), I(−), Q(+), and Q(−) of phase change signal fdo'-I, Q.

TABLE 1

|  | f8 − fdo1 (I phase) | f8 − fdo1 (Q phase) | f8 + fdo1 (I phase) | f8 + fdo1 (Q phase) |
| --- | --- | --- | --- | --- |
| fdo'-I(+) | fdo-I(+) | fdo-Q(+) | fdo-I(+) | fdo-Q(−) |
| fdo'-I(−) | fdo-I(−) | fdo-Q(−) | fdo-I(−) | fdo-Q(+) |
| fdo'-Q(+) | fdo-Q(+) | fdo-I(+) | fdo-Q(−) | fdo-I(+) |
| fdo'-Q(−) | fdo-Q(−) | fdo-I(−) | fdo-Q(+) | fdo-I(−) |

Multiplexer 530 is configured to receive mixed frequency output signal fmo-I, Q (representing a collection of signals fmo-I(+), fmo-I(−), fmo-Q(+), and fmo-Q(−)) and initialization signal fi-I, Q, and selectively output one thereof as first output signal fo1-I, Q. Thus the frequency of first output signal fo1-I, Q is that of the initialization signal fi-I, Q (eighth frequency f8, (f8−fd1), or (f8+fd1)). Since fdo1 can be fd1 or fd2, the frequency of first output signal fo1-I, Q can be eighth frequency f8, second frequency f2 (=f8−fd1), fourteenth frequency f14 (=f8+fd1), fifth frequency f5 (=f8−fd2), or eleventh frequency f11 (=f8+fd2).

Figure 5B:
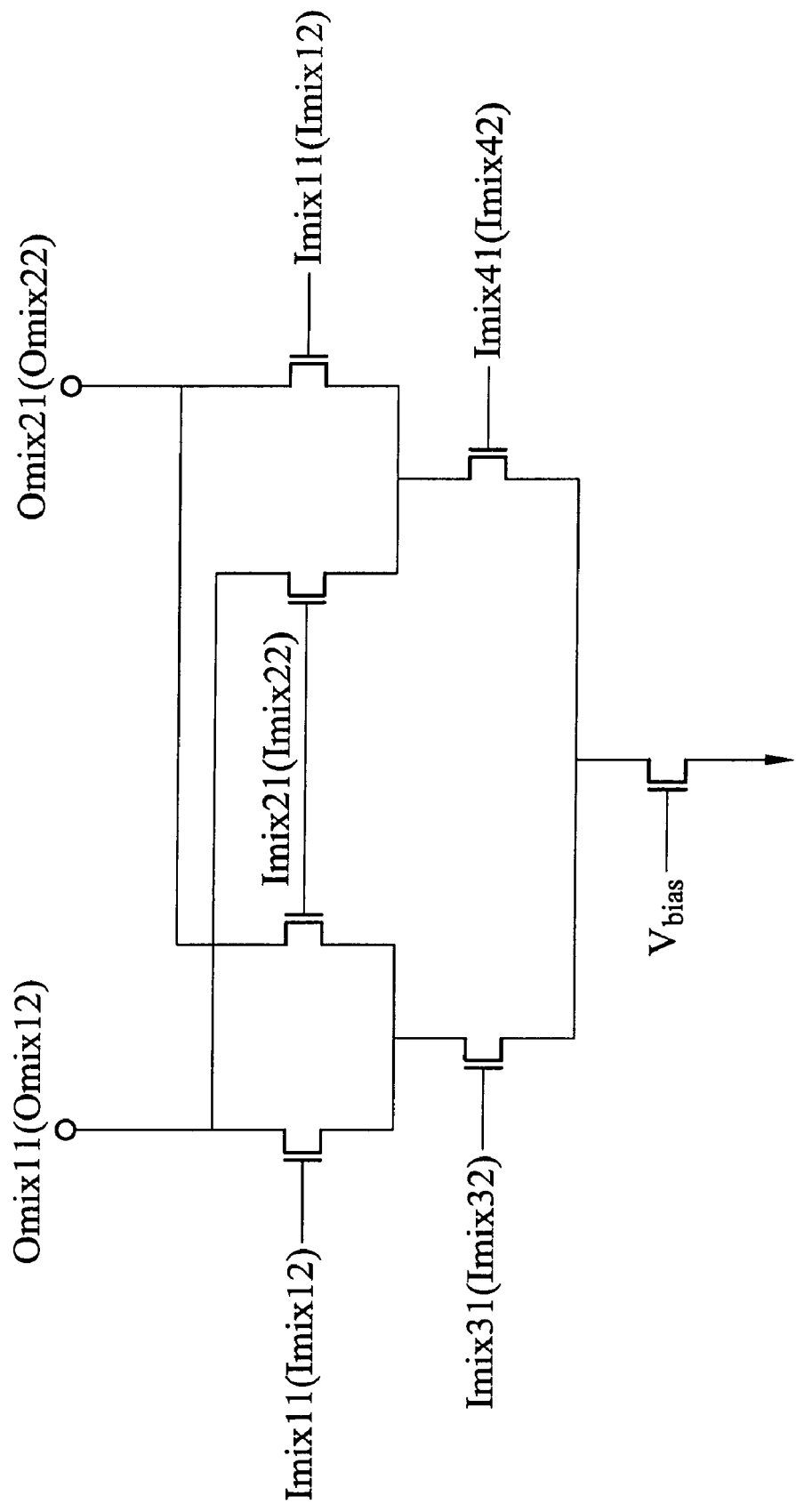
FIG. 5B details the circuit schematic of first and second frequency mixing circuits 523 and 524.

FIG. 5B details the circuit schematic of first and second frequency mixing circuits 523 and 524, and those in the art can adapt the circuitry in FIG. 5 as appropriate, with description of operation of the circuitry omitted herefrom for simplicity. The circuitry in FIG. 5 serves as an example only, without limiting the disclosure.

Figure 6:
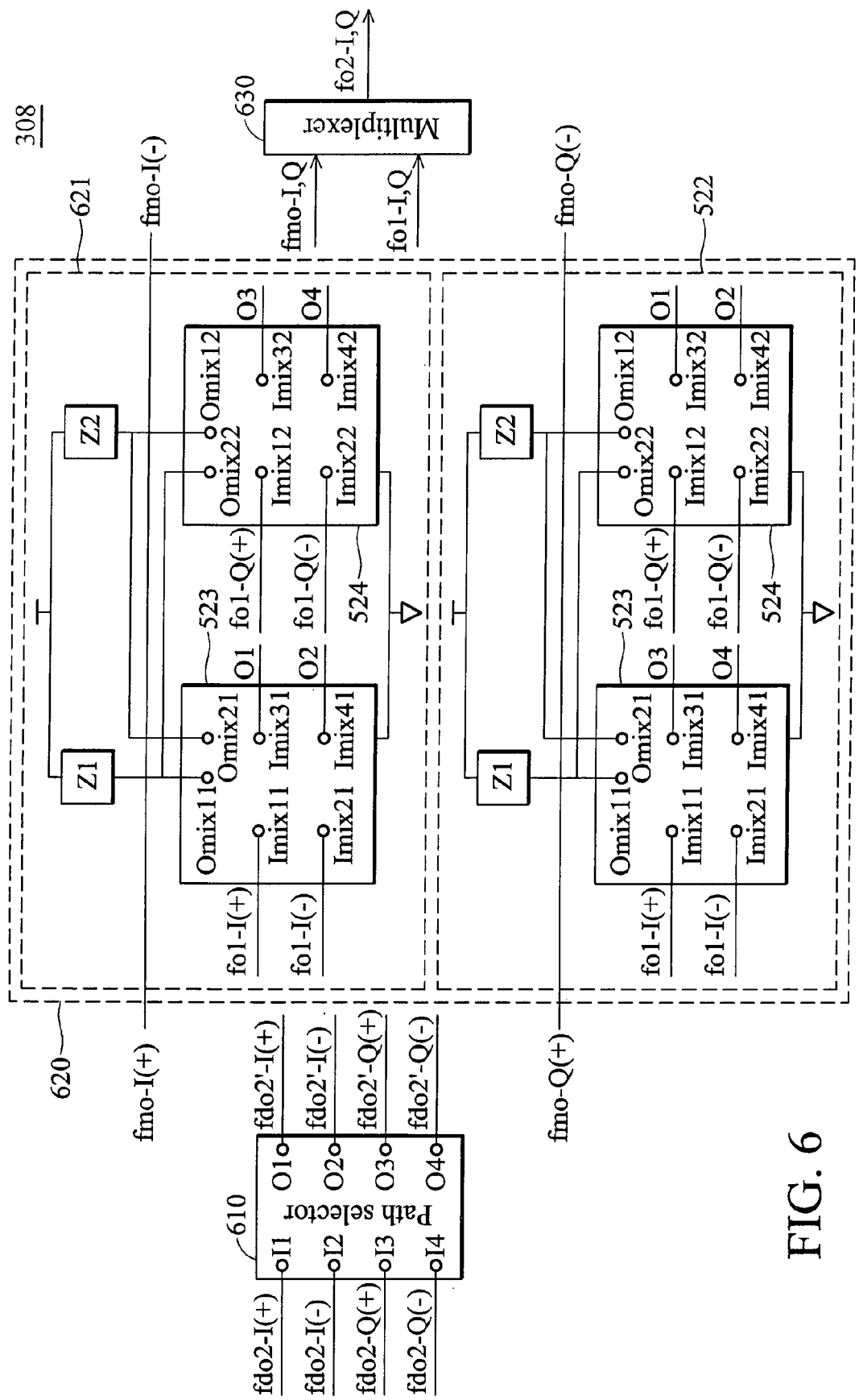
FIG. 6 is a circuit schematic of second mixer 308 in FIG. 3.

FIG. 6 is a circuit schematic of second mixer 308 in FIG. 3. Second mixer 308 comprises path selector 610, single band mixer 620, and multiplexer 630. Path selector 610 has an identical circuitry configuration to path selector 510, input terminals I1 and I2 of path selector 610 are coupled to non-inverting signal fdo2-I(+) and inverting signal fdo2-I(−) of second separation output in-phase signal fdo2-I, input terminals I3 and I4 are coupled to non-inverting signal fdo2-Q(+) and inverting signal fdo2-Q(−) of second separation output quadrature signal fdo2-Q. Single band mixer 620 (first and second blocks 621 and 622) has identical circuitry configuration with single band mixer 520 (first and second blocks 521 and 522), but input terminals Imix1 and Imix2 are coupled to non-inverting signal fo1-I (+) and inverting signal fo1-I (−) first output in-phase signal fo1-I, and input terminals Imix5 and Imix6 are coupled to non-inverting signal fo1-Q (+) and inverting signal fo1-Q (−) first output quadrature signal fo1-Q. multiplexers 630 and 530 are identical, but multiplexer 630 is configured to receive mixed frequency output signal fmo-I, Q from single band mixer 620 and first output signal fo1-I, Q from first mixer 308, and selectively output one thereof as second output signal fo2-I, Q.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of synthesizing frequency, producing a plurality of carrier frequencies for Ultra Wideband (UWB) with multi-band orthogonal frequency division multiplexing (MB-OFDM), the carrier frequencies comprising first through fourteenth frequencies in an order of low to high, any two adjacent carrier frequencies being separated by a fundamental separation frequency, the method comprising:
grouping the carrier frequencies into first through fifth frequency groups comprising the first to third frequencies, the fourth to sixth frequencies, the seventh to ninth frequencies, the tenth to twelfth frequencies, and the thirteenth to fourteenth frequencies;
generating a center frequency of the third frequency group;
performing frequency mixing on the center frequency of the third frequency group to produce center frequencies of the first, second, fourth, and fifth frequency groups; and
performing frequency mixing on the center frequencies of the first through fifth frequency groups to produce two adjacent frequencies for each center frequency.

2. The method of synthesizing frequency of claim 1, wherein the generation comprises:
generating first and second separation frequencies, each being an integer multiple of the fundamental separation frequency, and
performing the frequency mixing on the center frequency of the third frequency group and the first and second separation frequencies to generate the center frequencies for the first and fifth frequency groups, and the second and fourth frequency groups.

3. The method of synthesizing frequency of claim 1, wherein the first and second separation frequencies are six and three times the fundamental separation frequency.

4. The method of synthesizing frequency of claim 1, wherein producing the two adjacent frequencies comprises:
generating the fundamental separation frequency; and
performing the frequency mixing on the center frequencies of the first through fifth frequency groups and the fundamental separation frequency to generate the two adjacent frequencies for each center frequency.

5. A method of synthesizing frequency, producing a plurality of carrier frequencies for Ultra Wideband (UWB) with multi-band orthogonal frequency division multiplexing (MB-OFDM), the carrier frequencies comprising first through fourteenth frequencies in an order of low to high, any two adjacent carrier frequencies being separated by a fundamental separation frequency, the method comprising:
generating the eighth frequency;
generating first and second separation frequencies, and selecting a separation output frequency between the first and second separation frequencies, wherein the first and second separation frequencies are multiples of the fundamental separation frequency;
generating the fundamental separation frequency;
performing the frequency mixing on the eighth frequency and the separation output frequency to generate a first output frequency, wherein the output frequency is the eighth, second, fourteenth, fifth, or eleventh carrier frequency; and
performing frequency mixing selectively on the first output frequency and the fundamental separation frequency to generate a second output frequency, wherein the second output frequency is one of the first through fourteenth frequencies.

6. The method of synthesizing frequency of claim 5, wherein the first and second separation frequencies are six times and three times the fundamental separation frequency.

7. The method of synthesizing frequency of claim 5, wherein generating the first and second separation frequencies step comprises:
generating the first separation frequency; and
dividing the first separation frequency by an integer to generate the second separation frequency.

8. The method of synthesizing frequency of claim 5, wherein generating the fundamental separation frequency step comprises dividing the second separation frequency by an integer to generate the fundamental separation frequency.

9. The method of synthesizing frequency of claim 5, wherein generating the first and second separation frequency comprises:
generating the first separation frequency;
dividing the first separation frequency by an integer to generate the second separation frequency; and
wherein generating the fundamental separation frequency comprises dividing the second separation frequency by an integer to generate the fundamental separation frequency.

10. The method of synthesizing frequency of claim 5, wherein the generation of the eighth frequency utilizes a phase lock loop (PLL).

11. The method of synthesizing frequency of claim 10, wherein the generation of the first separation frequency utilizes the phase lock loop.

12. The method of synthesizing frequency of claim 9, wherein the generation of the eighth frequency utilizes a phase lock loop.

13. The method of synthesizing frequency of claim 12, wherein the generation of the first separation frequency utilizes the phase lock loop.

14. The method of synthesizing frequency of claim 12, wherein the first and the second integers are three and two.

15. A frequency synthesizer, producing a plurality of carrier frequencies for Ultra Wideband (UWB) with multi-band orthogonal frequency division multiplexing (MB-OFDM), the carrier frequencies comprising first through fourteenth frequencies in an order of low to high, any two adjacent carrier frequencies being separated by a fundamental separation frequency, the frequency synthesizer comprising:
  a phase lock loop, generating the eighth carrier frequency;
  a first mixer, performing selective frequency mixing on the eighth frequency to generate first output frequency, wherein the output frequency is the eighth, second, fourteenth, fifth, or eleventh carrier frequency; and
  a second mixer, performing selective frequency mixing on the first output frequency to generate second output frequency, wherein the output frequency is one of the first through the fourteenth frequencies; and
  a separation frequency generator, selectively outputting one of the first or the second separation frequencies as a separation output frequency, wherein the first and second separation frequencies are six times and three times the fundamental separation frequency, and the first mixer outputs the eighth frequency directly, or performs frequency mixing on the eighth frequency and the separation output frequency to generate one of the second, the fourteenth, the fifth, and the eleventh frequencies.

16. The frequency synthesizer of claim 15, further comprising a separation frequency generator, generating the basic separation frequencies as a separation output frequency, wherein the second mixer outputs the first output frequency directly, or performs frequency mixing on the first output frequency and the basic separation output frequency to generate one of the first, the third, the fourth, the sixth, the seventh, the ninth, the tenth, the twelfth, or the thirteenth frequencies.

17. The frequency synthesizer of claim 15, wherein the separation frequency generator further generates the basic separation frequencies as a separation output frequency, and the second mixer outputs the first output frequency directly, or performs frequency mixing on the first output frequency and the basic separation output frequency to generate one of the first, the third, the fourth, the sixth, the seventh, the ninth, the tenth, the twelfth, or the thirteenth frequencies.

18. A frequency synthesizer, producing a plurality of carrier frequencies for Ultra Wideband (UWB) with multi-band orthogonal frequency division multiplexing (MB-OFDM), the carrier frequencies comprising first through fourteenth frequencies in an order of low to high, any two adjacent carrier frequencies being separated by a fundamental separation frequency, the frequency synthesizer comprising:
  a phase lock loop (PLL), generating an initialization signal having a frequency equivalent to the eighth frequency;
  a separation frequency generator, outputting first and second separation output signals, wherein the first or second separation frequency equals a multiple of the fundamental separation frequency, and a frequency of the second separation output frequency is the fundamental separation frequency;
  a first mixer, performing frequency mixing on the eighth frequency and the separation output frequency to generate first output frequency, wherein the output frequency is the eighth, second, fourteenth, fifth, or eleventh carrier frequency; and
  a second mixer, performing frequency mixing selectively on the first output frequency and the fundamental separation frequency to generate second output frequency, wherein the output frequency is one of the first through fourteenth frequencies.

19. The frequency synthesizer of claim 18, wherein the first and second separation frequencies are six times and three times the fundamental separation frequency.

20. The frequency synthesizer claim 18, wherein the separation frequency generator comprises:
  a first divider, coupled to a first separation signal with a first separation frequency, dividing the first separation frequency by a first integer to generate a second separation signal with the second separation frequency; and
  a second divider, coupled to the second separation signal, dividing the second separation frequency by a second integer to generate the second separation output signal, and
  a multiplexer, receiving the first and second separation signals, and selectively outputting one thereof as the first separation output signal.

21. The frequency synthesizer claim 20, wherein the phase lock loop further outputs the first separation signal.

22. The frequency synthesizer claim 21, wherein the phase lock loop comprises first and second voltage control oscillators, outputting the initialization signal and the first separation signal respectively.

23. The frequency synthesizer claim 20, wherein the first and second integers are 2 and 3 respectively.

24. The frequency synthesizer claim 23, wherein the second divider comprises:
  a divide-by-3 circuit, receiving the second separation signal, dividing frequency of the second separation signal by the second integer to generate an output signal with two possible phases; and
  a multiphase filter, receiving the output signal to generate the second separation output signal with four possible phases.

25. The frequency synthesizer claim 18, wherein the first mixer comprises:
  a path selector, altering phase order of the first separation output signal to generate a changed phase signal;
  a single-side band mixer, performing frequency mixing on the initialization and the changed phase signal to generate mixed output signal, wherein the mixed output signal is one of the second, fourteenth, fifth, and eleventh signals; and
  a multiplexer, receiving the mixed output signal and the initialization signal, and outputting one thereof as the first output signal.

26. The frequency synthesizer claim 18, wherein the second mixer comprises:
  a path selector, altering phase order of the second separation output signal to generate a changed phase signal;
  a single-side band mixer, performing frequency mixing on the initialization and the changed phase signal to generate mixed output signal, wherein the mixed output signal is one of the first, third, fourth, sixth, seventh, ninth, tenth, twelfth, and thirteenth signals; and
  a multiplexer, receiving the mixed output signal and the first output signal, and selectively outputting one thereof as the second output signal.

* * * * *